Jan. 18, 1966  F. L. HOLFORD  3,230,436
MOTOR SPEED REDUCER
Filed June 5, 1961

*INVENTOR.*
FRANK L. HOLFORD
BY
ATTORNEYS:

United States Patent Office 3,230,436
Patented Jan. 18, 1966

3,230,436
MOTOR SPEED REDUCER
Frank L. Holford, Towson, Md., assignor, by mesne assignments, to the United States of America as represented by the Secretary of the Army
Filed June 5, 1961, Ser. No. 115,053
1 Claim. (Cl. 318—297)

This invention relates to direct current motors and more particularly concerns a device for converting a direct current series wound motor into a motor having compound characteristics when its armature is rotated in one specific direction.

In applications where it is desired to raise or lower an object mechanically as an aircraft canopy, for example, the motor selected must be capable of meeting the space and electrical limitations afforded by the aircraft in which it is to be used and yet possess sufficient power to raise the canopy at suitable speeds. Typical direct current series wound motors are characterized by low cost, ease of installation, extreme compactness and light weight in proportion to the amount of power delivered. Their varying speed characteristics however, and high no-load and aiding load speeds are objectionable in aircraft canopy applications. For example, when the motor is subjected to an aiding load, such as when the canopy is being lowered, the armature is caused to rotate at very high speeds resulting in excessive wear of parts, sudden stops promoting shearing of the canopy pin, and the like.

It is therefore a broad object of the invention to provide a modified direct current series wound motor which has added utility over conventional motors of this type when used in aircraft canopy removing applications and the like.

Another object of the invention is to provide means for converting a commercially available direct current series wound motor into a motor of the compound type when rotated in one direction, said conversion means being extremely low in cost, small in size, and easily and rapidly affixable to the motor.

Still another object of the invention is to provide a direct current series wound motor, useful in the applications aforementioned, with an attachment for preventing runaway speeds of the motor when subjected to aiding loads.

Figure 1:
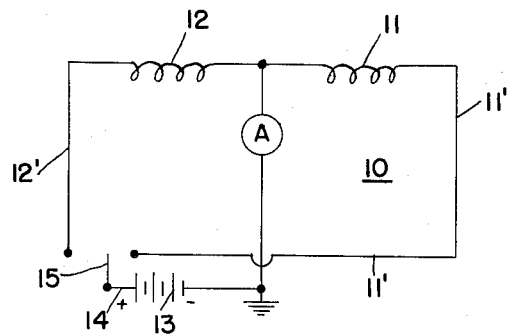
Figure 2:
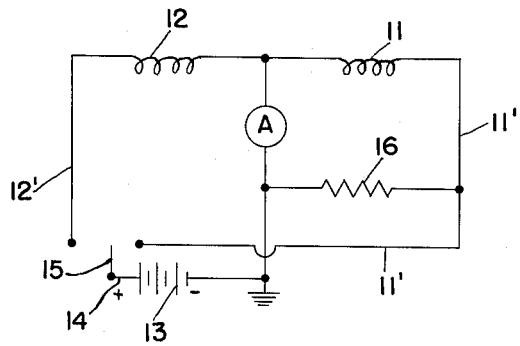

The exact nature of this invention as well as other objects and advantages thereof will be readily apparent from consideration of the following specification relating to the annexed drawings wherein:

FIG. 1 is a schematic diagram of a typical direct current series wound motor used in aircraft canopy removing; and FIG. 2 is a schematic diagram of the motor of FIG. 1 but including a simple resistor element which converts the motor to compound in one direction of rotation.

Referring to FIG. 1, a direct current series wound motor 10 is shown having a forward field winding 11 connected serially to a reverse field winding 12, each of the windings having an electric conductor 11' and 12' respectively leading therefrom.

A suitable direct current power source, such as a battery 13, has its positive side connected to a switch 14, which includes a manually controllable movable arm 15 for contacting either one of the conductors leading from the windings. The negative side of battery 13 leads to ground. Armature A, grounded as shown, is interposed between the forward and reverse field windings.

In the operation of the motor, the extension or raising of the canopy by the operator is accomplished by moving the arm 15 to the right in the drawing such that it will contact conductor 11' leading to the forward field winding and completing a circuit from battery 13 to forward field winding 11 and through armature A to ground. When the canopy is sufficiently extended, the operator will move arm 15 into its neutral position, as illustrated in FIG. 1. In lowering the canopy, arm 15 is moved to contact conductor 12' to complete a circuit from the battery to the reverse field winding and through the armature to ground.

In a direct current series wound motor, the armature speed is dependent, among others, on the load; that is, the speed increases as the load decreases, within limits. As a typical example, in using a 0.28 horsepower direct current series wound motor with a B+ voltage of about 28, and the weight of the screw-operated canopy at about 300 pounds, the motor will have a no-load speed approximating 22,000 r.p.m. (high r.p.m.-low torque) which decreases to about 14,000 r.p.m. when raising the above load but increases to about 33,000 r.p.m. when lowering or being aided by the load. This extremely high aiding load motor speed is objectionable for reasons mentioned earlier herein.

I have discovered a simple expedient for preventing such high aiding load speeds, said expedient comprising a resistor interposed between the armature and ground and conductor 11', all as embodied in the drawing of FIG. 2, wherein like reference numerals designate like parts in FIG. 1 aforedescribed.

With the resistor 16 positioned in the motor as illustrated, the arm 15, in contacting conductor 12', completes a circuit through the reverse field winding 12, a portion passing through the armature to ground and the remaining portion to be diverted to the forward field winding and resistor which are in parallel relation to the armature. The current passing through the forward field winding and resistor varies as the ohmic value of resistor 16 is changed.

The motor, in the reverse direction of rotation, has now been converted to compound series-shunt, the shunt field adding to the series field and resulting in lower aiding load armature speeds.

Using a direct current series wound motor with the aforedescribed values, I have been able to lower the canopy aiding load armature speed from 33,000 r.p.m. to about 14,000 r.p.m. by placing a 1¼ ohm resistor in the motor as shown in FIG. 2.

It will be understood, of course, that the ohmic value of the resistor selected will depend on the aiding load armature speed desired, within limits. For example, under the same conditions, i.e., 0.28 horsepower, 28 B+ voltage, etc., a 5 ohm resistor will result in an aiding load armature speed of about 17,000 r.p.m. On the other hand, if a conductor having negligible resistance be connected in lieu of the resistor shown in the drawing, the aiding load armature speed will be about 14,000 r.p.m. but will now require a considerably greater current.

I have found that the empirical determination of the optimum ohmic resistor value is the best and fastest method, since inherent variations in direct current series wound motors make it rather difficult to calculate the exact resistance needed for a specific aiding load armature speed.

The resistor 16 also serves to bypass some current when the arm is contacting conductor 11' and the forward field winding, but this wasted power in the forward direction only is deemed to be more than offset by the overall advantages to be gained in its reverse direction.

I claim:

A reversible direct-current series-wound driving motor and control circuit for use with apparatus providing an aiding load in one direction of operation and comprising, serially-connected forward and reverse field windings, each of said windings having an electric conductor leading thereto, a direct-current power source, a selector switch having a single manually-controllable contact arm connected to the positive side of the power source, said power source having its negative side leading to ground, said switch having two selectable contacts for said manually-controllable contact arm each connected with one of the conductors leading to said windings, a grounded armature connected at a point between the windings, a resistor connected between the armature ground and the conductor leading to said forward field winding for providing a compound motor connection for driving an aiding load when said arm is selectively connected with the conductor leading to said reverse field winding, said resistor having an ohmic value in accordance with the aiding load speed desired, and said motor being series wound when said arm is selectively connected with the conductor leading to the forward field winding.

References Cited by the Examiner

UNITED STATES PATENTS 2,623,202  12/1952  Kronacher _____ 318—252 X

FOREIGN PATENTS 540,547  10/1941  Great Britain.

MILTON O. HIRSHFIELD, *Primary Examiner.*

ORIS L. RADER, *Examiner.*

J. C. BERENZWEIG, D. J. SHREWSBERRY,
*Assistant Examiners.*